United States Patent [19]

Attwood

[11] Patent Number: 5,412,388
[45] Date of Patent: May 2, 1995

[54] POSITION AMBIGUITY RESOLUTION

[75] Inventor: Stanley W. Attwood, Sun Lakes, Ariz.

[73] Assignee: Motorola, Inc., Schaumburg, Ill.

[21] Appl. No.: 105,235

[22] Filed: Aug. 11, 1993

[51] Int. Cl.⁶ .......................... G01S 5/02; G01C 21/00
[52] U.S. Cl. ...................................... 342/357; 64/449
[58] Field of Search .................. 342/357, 450, 457; 364/449

[56] References Cited

U.S. PATENT DOCUMENTS

| | | | |
|---|---|---|---|
| 4,728,959 | 3/1988 | Maloney et al. | 342/457 |
| 4,797,677 | 1/1989 | MacDoran et al. | 342/352 |
| 4,860,352 | 8/1989 | Laurance et al. | 380/23 |
| 5,119,101 | 6/1992 | Barnard | 342/357 |
| 5,119,504 | 6/1992 | Durboraw, III | 455/54.1 |
| 5,177,489 | 1/1993 | Hatch | 342/357 |

OTHER PUBLICATIONS

"Emitter Location Accuracy Using TDOA and Differential Doppler" by Paul C. Chestnut from IEEE Transactions on Aerospace and Electronic Systems, vol. AES-18, No. 2, Mar. 1982.

"Geolocation of Frequency-Hopping Transmitters via Satellite" by A. Sonnenschein and W. K. Hutchinson from Technical Report 900, Nov., 1990.

"Geolocation via Satellite: A Methodology and Error Analysis" by M. J. Shensa from Technical Report 1244, May 1988.

Primary Examiner—Gregory C. Issing
Attorney, Agent, or Firm—Robert M. Handy; Phillip E. Hall; Kevin K. Johanson

[57] ABSTRACT

A radio telecommunications system includes a number of locator satellites in low earth orbits. Locatable subscriber units communicate with the satellites. A single subscriber unit communicates with a single satellite using electromagnetic signals so that a measurement processor can obtain Doppler component, propagation duration, and real time measurements of the signals. A location processor converts these measurements into a two-position location solution. The two-position solution includes an actual position and an image position. The actual position may be detected in some situations by identifying a cell within which communications take place. In other situations, the actual position may be distinguished from the image position by detecting the eastward rotation of the earth. A service processor determines which qualifications to apply to communication services offered by the system. These qualifications are based on the subscriber unit's location.

31 Claims, 8 Drawing Sheets

POSITION AMBIGUITY RESOLUTION

CROSS-REFERENCE TO RELATED APPLICATIONS

This application is related to commonly assigned United States Patent Applications:

"Multibeam Position Ambiguity Resolution" by Keith Olds, Attorney Docket Number IRI03065;

"Location System and Method with Acquistion of Accurate Location Parameters" by Kristine Maine, Keith Olds and Stanley Attwood, Attorney Docket Number IRI03053;

"Geolocation Responsive Radio Telecommunication System and Method Therefor", by Kristine Maine, Keith Olds, and Gerald Davieau, Attorney Docket Number IRI03052; and "Radio Telecommunications System and Method with Adaptive Convergence Location Determination", by Keith Olds and Kristine Maine, Attorney Docket Number IRI03049.

TECHNICAL FIELD OF THE INVENTION

The present invention relates generally to location determination systems. More specifically, the present invention relates to location determination systems in which measured location parameters yield a plurality of equally credible locations of which only one is actually correct and to radio telecommunications systems which employ such location determination systems.

BACKGROUND OF THE INVENTION

Prior art location determination systems, such as Global Positioning System (GPS), GLONASS, Loran, and the like, are known. Such systems rely, for the most part, on triangulation. In other words, these prior art location determination systems use two or more transmitters or receivers ("locators") located at distant positions. The locators are capable of transmitting or receiving signals to or from a locatable unit residing at a location to be determined. When given the locators' positions, the position of the locatable unit may be determined essentially by triangulation after measuring characteristics of the signals communicated between the locatable unit and the two locators.

Such prior art location determination systems achieve adequate performance for many different applications. However, they fail to provide an adequate solution for location determination in connection with a substantially global radio telecommunications system that can provide communication services to substantially any point on or near the surface of the earth. Such a radio telecommunications system desirably operates with portable subscriber units. In order for subscriber units to have acceptable portability, they are desirably capable of low power battery operation, and they are desirably capable of transmitting and receiving electromagnetic signals through a relatively small antenna.

While subscriber units could be configured to incorporate components which take advantage of existing location determination systems, these components would substantially increase costs of the subscriber units. Moreover, relying on existing location determination systems could reduce reliability of a radio telecommunications system by introducing reliance upon an external system.

The techniques used by prior art location determination systems might possibly be incorporated into a radio telecommunications system, but the introduction of such techniques could seriously degrade communication services. For example, the requirement for two or more locators to be within view over the entire globe makes this approach impractical. While this requirement might be met by placing satellites in high or geosynchronous orbits around the earth, higher orbits place satellites further away from subscriber equipment on the earth. This larger distance causes the subscriber equipment to consume excessive power or incorporate massive antennas just to participate in communication services. Moreover, higher orbits require increased spectrum allocation to carry a given amount of communications because the allocated spectrum may be reused less frequently in a given area.

SUMMARY OF THE INVENTION

Accordingly, it is an advantage that the present invention provides an improved location determination system and method which are suitable for use in a radio telecommunications system and other applications.

Another advantage of the present invention is that locations for subscriber units are determined.

Another advantage is that the present invention may determine locations for subscriber units using no more that a single satellite which orbits the earth in a low earth orbit.

Another advantage is that the present invention measures characteristics of a first signal communicated between a single locator unit and a locatable unit to obtain a plurality of credible locations for the locatable unit, then processes measured characteristics of a second communicated signal to select an actual position for the locatable unit.

Another advantage is that the present invention detects earth rotation to distinguish an actual position from an image position.

The above and other advantages of the present invention are carried out in one form by a method of distinguishing an actual position from an image position in a location determination system. The method calls for obtaining a set of original location parameters. This original set describes a first position and a second position. A set of subsequent location parameters are then acquired. The one of the first and second positions which, in response to the sets of original and subsequent location parameters, appears to move in a generally eastward direction over time is selected as the actual position.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
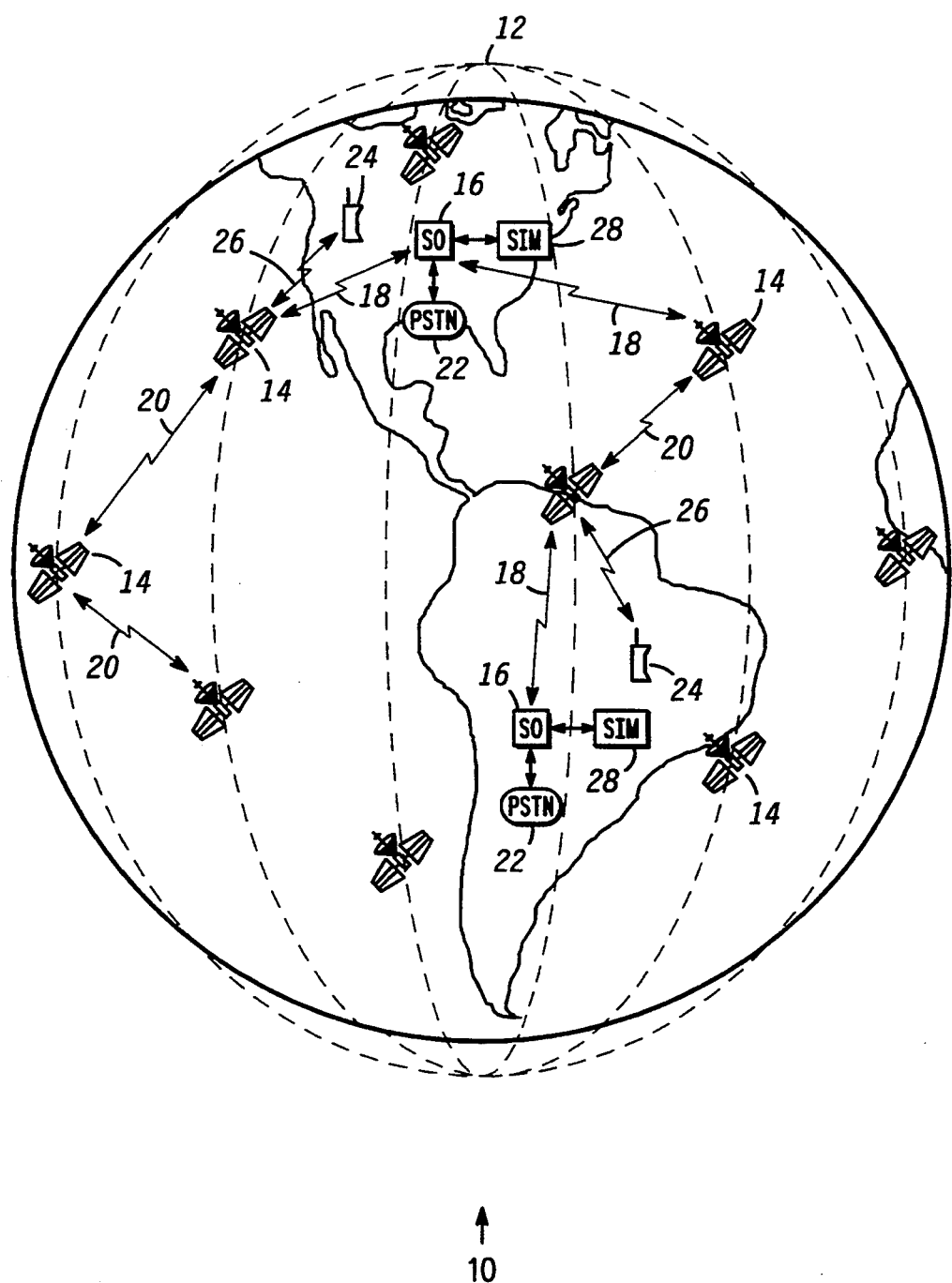
FIG. 1 shows a layout diagram of an environment within which a radio telecommunications system employing a location determination system may operate.

FIG. 1 shows a layout diagram of an environment within which a radio telecommunications system 10 operates. System 10 includes a constellation 12 consisting of several satellites 14 placed in relatively low orbits around the earth. Each satellite 14 has a unique identification number associated with it so that satellites 14 may be distinguished from one another. Due to the configuration of constellation 12, at least one of satellites 14 is desirably within view of each point on the surface of the earth at all times. Satellites 14 preferably occupy polar orbits. In other words, satellites 14 move substantially in a south to north or a north to south direction relative to a point on the surface of the earth. In connection with a location determination system implemented by system 10, each satellite 14 functions as a locator, but no more than one locator is required to determine a location.

The earth rotates within constellation 12. In other words, the daily rotation of the earth has little or no influence upon the motion of satellites 14 within constellation 12. The earth rotates in a direction which is continually deemed to be east, regardless of whether a point on the surface is approaching or receding from a point in space, such as the sun, or a particular point in an orbit of constellation 12. Hence, system 10 preferably orbits satellites 14 in a direction which is substantially perpendicular to the rotation of the earth.

System 10 additionally includes one or more switching offices (SOs) 16. SOs 16 reside on the surface of the earth and are in data communication with nearby ones of satellites 14 through RF communication channels 18. Satellites 14 are also in data communication with one another through data communication channels 20. Hence, through constellation 12 of satellites 14, an SO 16 may control communications delivered to any size region of the earth. However, the region controlled by each SO 16 is preferably associated with one or more specific geo-political jurisdictions, such as one or more countries. SOs 16 couple to public switched telecommunication networks (PSTNs) 22, from which calls directed toward subscribers of system 10 may be received and to which calls placed by subscribers of system 10 may be sent.

System 10 also includes any number, potentially in the millions, of subscriber units (SUs) 24. SUs 24 may be configured as conventional portable radio communication equipment. In other words, SUs 24 may be battery powered, may consume relatively low power, and may include relatively small antennas. SUs 24 are configured to engage in communications with satellites 14 over portions of the electromagnetic spectrum that are allocated by governmental agencies associated with various geopolitical jurisdictions. SUs 24 communicate with nearby satellites 14 through communication channels 26. In connection with the location determination system implemented by system 10, SUs 24 function as locatable units.

System 10 accommodates the movement of SUs 24 anywhere on or near the surface of the earth. However, nothing requires SUs 24 to move, and system 10 operates satisfactorily if a portion of the entire population of SUs 24 remains stationary relative to the earth. Since SUs 24 reside on or near the surface of the earth, SUs 24 nevertheless move through space in response to earth rotation. Regardless of whether an SU 24 moves with respect to a point on the surface of the earth, the SU 24 moves relative to constellation 12 and satellites 14 as it rides the earth through the earth's daily rotation. The rotation of the earth causes an SU 24 located near the equator to move in a generally eastward direction relative to constellation 12 at a rate of around 6.3 Km/sec. An SU 24 located near 60@ latitude moves in a generally eastward direction relative to constellation 12 at around 3.1 Km/sec.

Any number of Subscriber Information Managers (SIMs) 28 are also included within system 10. Each SIM 28 maintains a subscriber database that is relevant to only a discrete portion of the population of SUs 24. The database may include information describing features associated with SUs 24, rates to be associated with SUs 24, current locations for SUs 24, and other information which is discussed below. Each SU 24 is assigned to one of SIMS 28, and that one SIM 28 is considered the "home" SIM 28 for an SU 24. In the preferred embodiment, an SIM 28 may be associated with each SO 16. In fact, an SIM 28 and an SO 16 may utilize the same computerized hardware. In such an embodiment, an SIM 28 and an SO 16 are separated logically rather than physically. Each SO 16 may communicate with any SIM 28 through constellation 12, PSTN 22, or internal computer structures when an SO 16 communicates with its logical partner SIM 28.

In general terms, system 10 may be viewed as a network of nodes. Each SU 24, satellite 14, SO 16, and SIM 28 represents a node of system 10. All nodes of system 10 are or may be in data communication with other nodes of system 10 through communication channels 18, 20, and/or 26. In addition, all nodes of system 10 are or may be in data communication with other telephonic devices dispersed throughout the world through PSTNs 22.

Communication services, including calls, may be set up between two SUs 24 or between any SU 24 and a PSTN phone number. Except for qualifying processes which are discussed below, calls may be set up between any two locations on the earth. Generally speaking, each SU 24 engages in control communications with a nearby SO 16 through constellation 12 during call setup. These control communications take place prior to forming a communication path between an SU 24 and another unit, which may be another SU 24 or a PSTN phone number. In particular, an SU 24 communicates with the SO 16 via one or more satellites 14. This SO 16 may be considered the serving SO for that particular SU 24.

Due to their low earth orbits, satellites 14 constantly move relative to the earth. In the preferred embodiments, satellites 14 move in orbits at an altitude in the range of 500–1000 Km above the earth. If, for example, satellites 14 are placed in orbits which are around 765 km above the earth, then an overhead satellite 14 travels at a speed of around 25,000 km/hr with respect to a point on the surface of the earth. Electromagnetic signals traveling at or near the speed of light between an SU 24 positioned near the surface of the earth and a satellite communication node 14 in such an orbit will require a propagation duration of 2–3 msec or more, depending on the satellite's angle of view. Moreover, electromagnetic signals traveling between an SU 24 positioned near the surface of the earth and a satellite 14 in such an orbit may experience a considerable Doppler component of frequency shift, the precise value of which is dependent on a source frequency and the satellite's angle of view.

Figure 2:
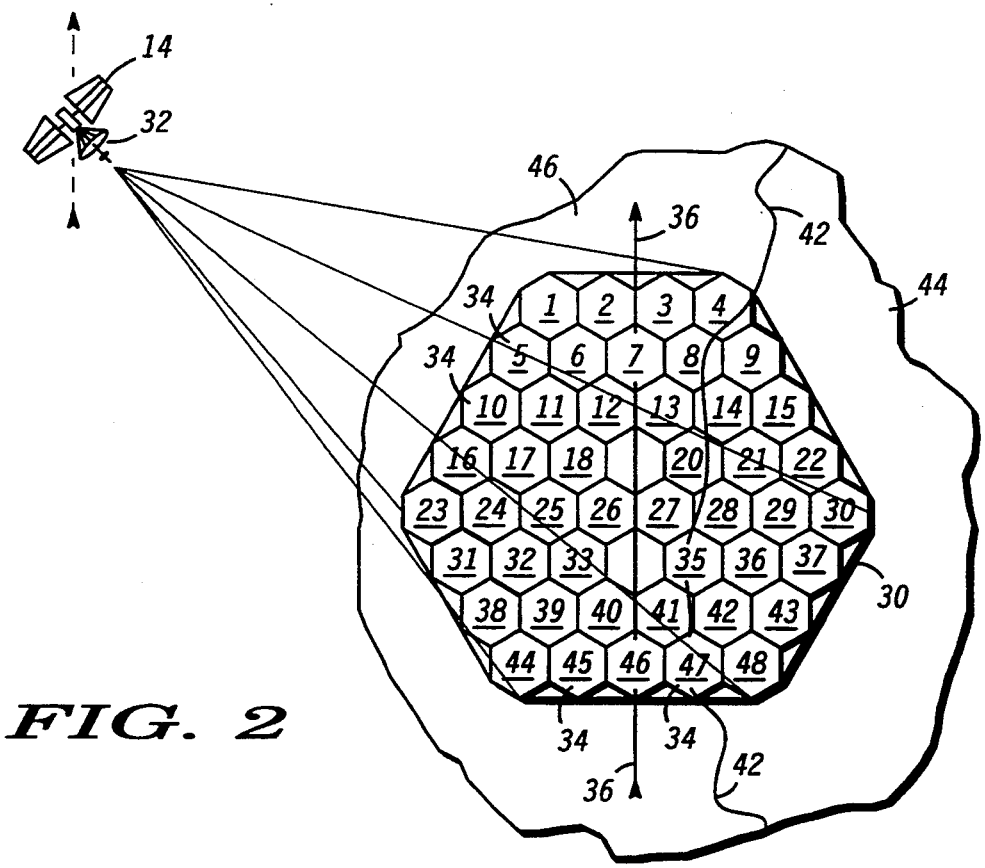
FIG. 2 shows a cellular pattern formed on the surface of the earth by a satellite portion of the radio telecommunications system.

FIG. 2 shows a cellular footprint pattern 30 formed on the surface of the earth by a single satellite 14. Each satellite 14 includes an array 32 of directional antennas. Each array 32 projects numerous discrete antenna patterns on the earth's surface at numerous diverse angles away from its satellite 14. FIG. 2 shows a diagram of a resulting pattern of cells 34 that a satellite 14 forms on the surface of the earth. Desirably, other satellites 14 (not shown) form other footprints (not shown) so that cells 34 substantially cover the entire surface of the earth.

Each cell 34 within footprint 30 occupies a unique position within footprint 30. These positions are distinguished from one another through the use of a cell ID, listed as 1 through 48 in FIG. 2. Some degree of location information may be obtained by identifying a cell 34 that covers a position of interest. Such location information defines a position relative to a satellite 14. Satellites 14 preferably orbit the earth in predictable orbits. In other words, a satellite's position at a particular point in time may be determined by combining the point in time with well known orbital geometry. By combining a cell's position within a footprint 30 with the satellite's position, a broadly specified location on the earth may be obtained.

For convenience, FIG. 2 illustrates cells 34 and footprint 30 as being discrete, generally hexagonal shapes without overlap or gaps. However, those skilled in the art will understand that in actual practice equal strength lines projected from the antennas of satellites 14 may actually have a shape far different than a hexagonal shape, that antenna side lobes may distort the pattern, that some cells 34 may cover larger areas than other cells 34, and that some overlap between adjacent cells may be expected.

System 10 (see FIG. 1) communicates through satellites 14 with SUs 24 (see FIG. 1) using a limited amount of the electromagnetic spectrum. The precise parameters of this spectrum are unimportant to the present invention and may vary from system to system. The present invention divides this spectrum into discrete portions or channel sets. For example, the spectrum may be divided into discrete frequency bands, discrete time slots, discrete coding techniques, or a combination of these. The precise manner of dividing this spectrum is also unimportant to the present invention. Desirably, each of these discrete channel sets is orthogonal to all other channel sets. In other words, simultaneous communications may take place at a common location over every channel set without significant interference. As is conventional in cellular communication systems, the channel sets are assigned to cells 34 through a reuse scheme which prevents adjacent cells 34 from using the same channel sets. However, common channel sets are reused in spaced apart cells 34 to efficiently utilize the allocated spectrum.

Each satellite 14 is associated with a nadir direction. The nadir direction is defined by an imaginary line (not shown) extending from the satellite 14 toward the center of the earth. For a given satellite 14, a ground point resides where the nadir direction intersects the surface of the earth. As the satellite 14 moves around the earth in its orbit, this ground point forms a satellite ground track 36. As shown in FIG. 2, a first portion of cells 34 in footprint 30 resides clearly to the left of ground track 36, a second portion of cells 34 in footprint 30 resides clearly to the right of ground track 36, and a third portion of cells 34 generally overlies ground track 36. When ground track 36 appears to reside near the boundary between two cells 34, such as between cells "2" and "3" in FIG. 2, both of such cells 34 may be deemed to reside over ground track 36.

On the surface of the earth, a boundary 42 separates a first jurisdiction 44 from a second jurisdiction 46. Any number of boundaries 42 may divide the entire earth's surface into any number of different jurisdictions. Boundaries 42 need not represent physical phenomena of the earth. Rather, boundaries 42 represent lines imposed over the geography of the earth to achieve some of the goals of radio telecommunication system 10 (see FIG. 1). Nothing prevents the existence of more than one set of boundaries 42 corresponding to the same sections of the earth. Boundaries 42 may divide the earth into geopolitical jurisdictions, communication service rate jurisdictions, and the like. System 10 qualifies communication services provided to an SU 24 in accordance with the one or more jurisdictions within which the SU 24 resides.

Figure 3:
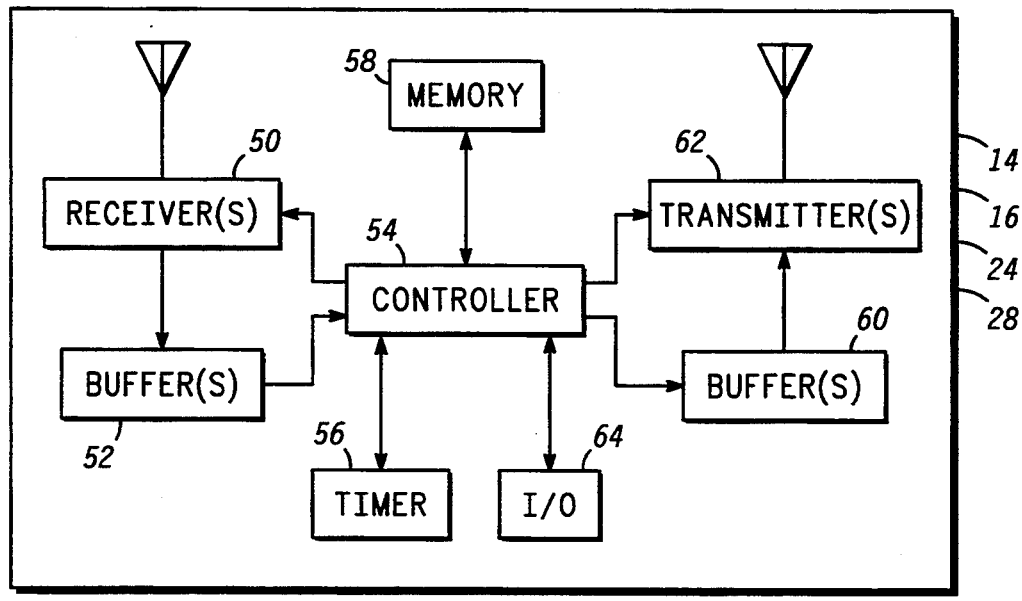
FIG. 3 shows a block diagram of a node of the radio telecommunications system.

FIG. 3 shows a block diagram of any node 48 of radio telecommunications system 10 (see FIG. 1). As discussed above, any SU 24, satellite 14, SO 16, or SIM 28 represents a node of system 10. Node 48 includes one or more receivers 50. Receivers 50 receive signals from communication channels 18, 20, and/or 26 (see FIG. 1). While an SU 24, SO 16, or SIM 28 may include only a single receiver 50, a satellite 14 includes many receivers for simultaneously communicating over numerous different ones of channels 18, 20, and 26 (see FIG. 1). Receivers 50 couple to receive buffers 52, which temporarily store data received at receivers 50 until these data can be processed.

A controller 54 couples to receive buffers 52 and to receivers 50. Controller 54 couples to receivers 50 to control receive parameters, such as frequency, timing, and the like. Controller 54 additionally couples to a timer 56, a memory 58, transmit buffers 60, and transmitters 62. Controller 54 uses timer 56 to help monitor real time through maintaining the current date and time. Memory 58 includes data which serve as instructions to controller 54 and which, when executed by controller 54, cause node 48 to carry out processes which are discussed below. In addition, memory 58 includes variables, tables, and databases that are manipulated due to the operation of node 48. Transmit buffers 60 are used to temporarily store data placed therein by controller 54. Controller 54 couples to transmitters 62 to control transmit parameters, such as frequency, timing, and the like. While SUs 24, SOs 16, and SIMs 28 may include only one transmitter 62, satellites 14 desirably include numerous transmitters 62 for simultaneously communicating over numerous different ones of channels 18, 20, and 26 (see FIG. 1). Transmit buffers 60 also couple to transmitters 62. Transmitters 62 transmit signals modulated to carry the data stored in transmit buffers 60. These signals are transmitted over channels 18, 20, and 26. Communications over channels 18, 20, and/or 26 may be either coherent or non-coherent communications.

In earth-based nodes 48, controller 54 also couples to an I/O section 64. In an SU 24, I/O section 64 may include microphones, speakers, digitizers, vocoders, decoders, and the like, to convert between audio and digitized packets that are compatible with system 10 (see FIG. 1). Likewise, I/O section 64 may include a keypad for controlling the operation of SU 24 by a user. In an SO 16 or SIM 28, I/O section 64 may include keyboards, displays, magnetic memory devices, printers, and other devices conventionally coupled to computerized equipment. In an SO 16, I/O section 64 may additionally include components for coupling to a PSTN 22 (see FIG. 1).

In short, each node 48 represents a programmable machine which takes on the character assigned to it by software programming located in memory 58 and executed by controller 54. As is discussed below, the present invention configures nodes 48 as measurement processors 66 (see FIG. 4), location processors 68 (see FIG. 5), service processors 70 (see FIG. 9), and the like. Since each node 48 is or may be in data communication with other nodes 48, the precise location and distribution of many of these processors and the tasks they perform are less important considerations. By way of example, the functions of SIMs 28 may be performed on the same hardware which performs the functions of SOs 16, or the functions may be performed on different hardware. While the differences between processors 66, 68, and 70 may be physical due to their location in different ones of SUs 24, satellites 14, SOs 16, and SIMs 28, any physical differences may be of only minor importance. Rather, processors 66, 68, 70 are logically distinct from one another.

Figure 4:
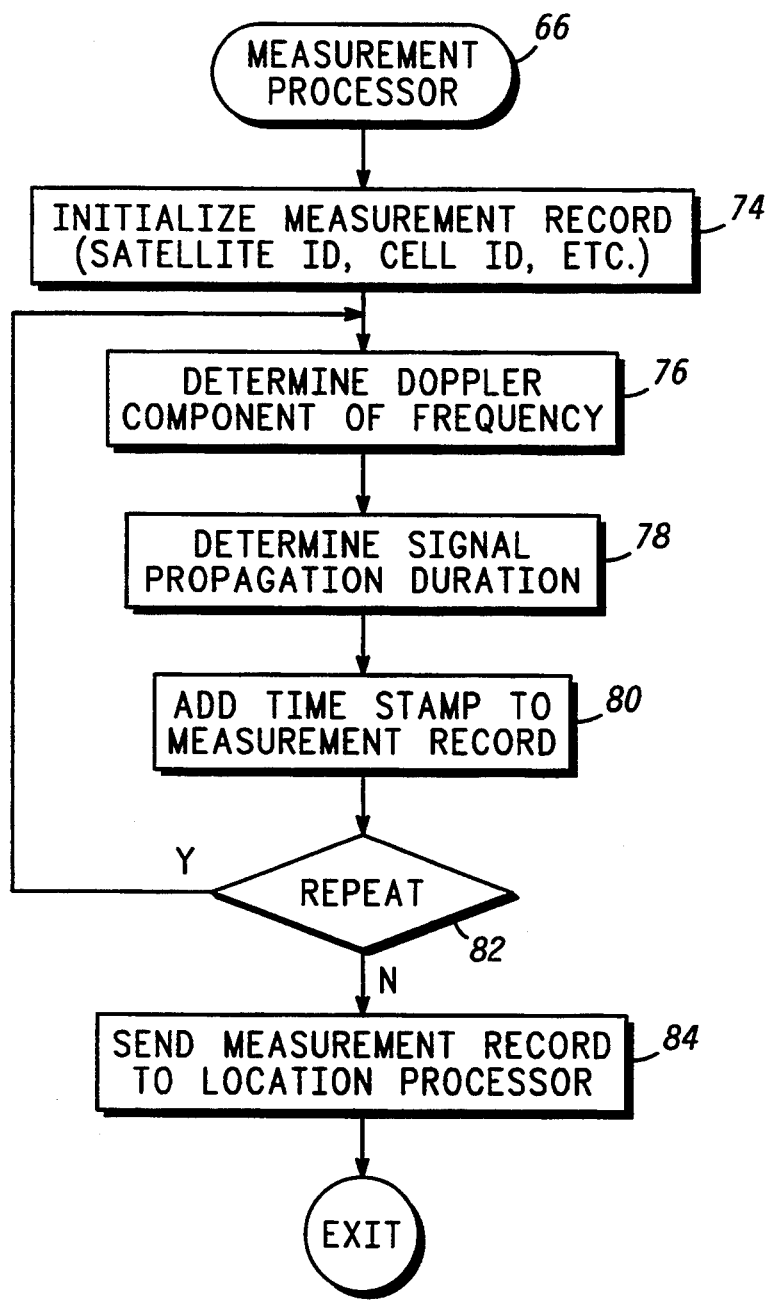
FIG. 4 shows a flow chart of tasks performed by a measurement processor portion of the radio telecommunications system.
Figure 5:
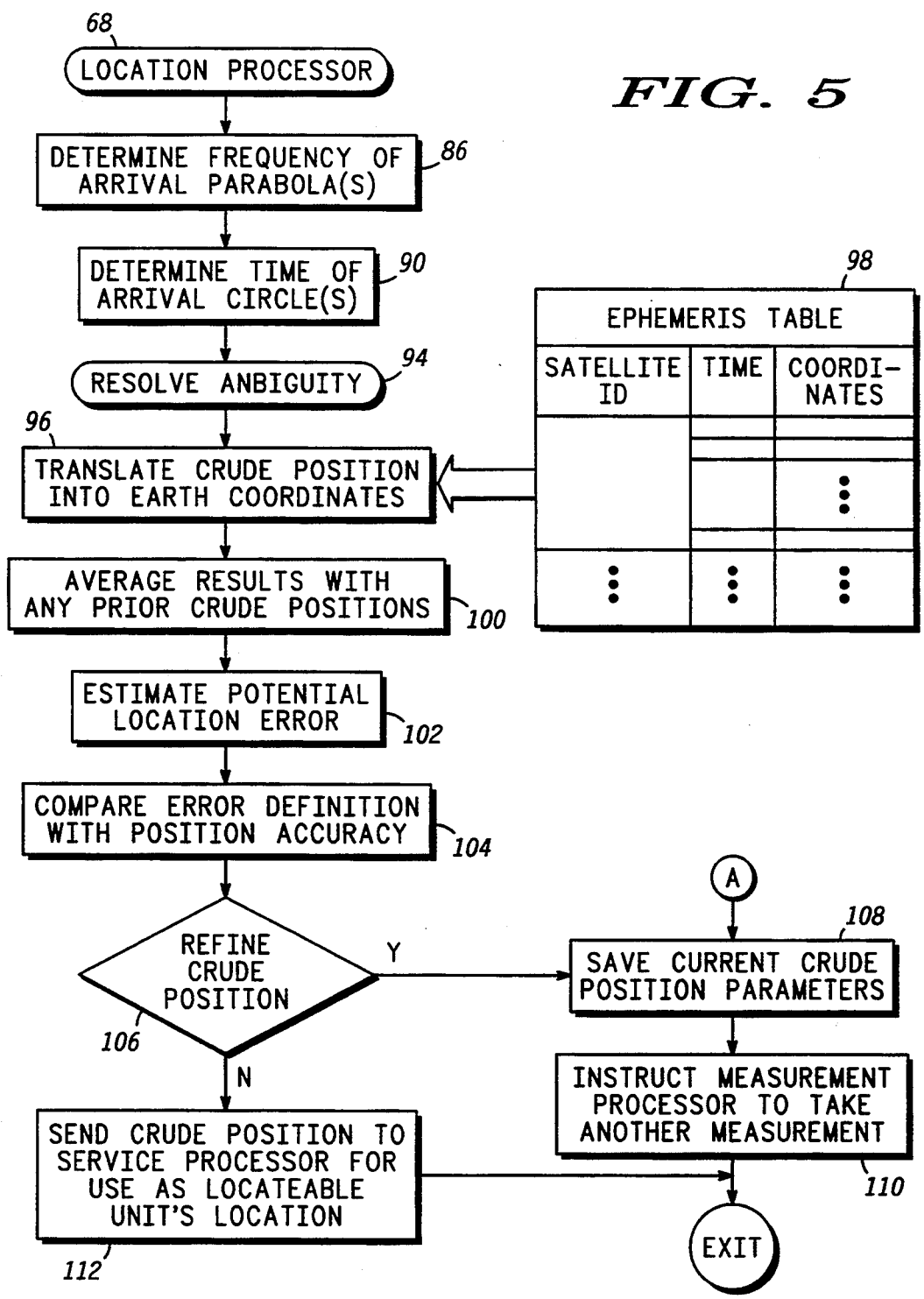
FIG. 5 shows a flow chart of tasks performed by a location processor portion of the radio telecommunications system.
Figure 9:
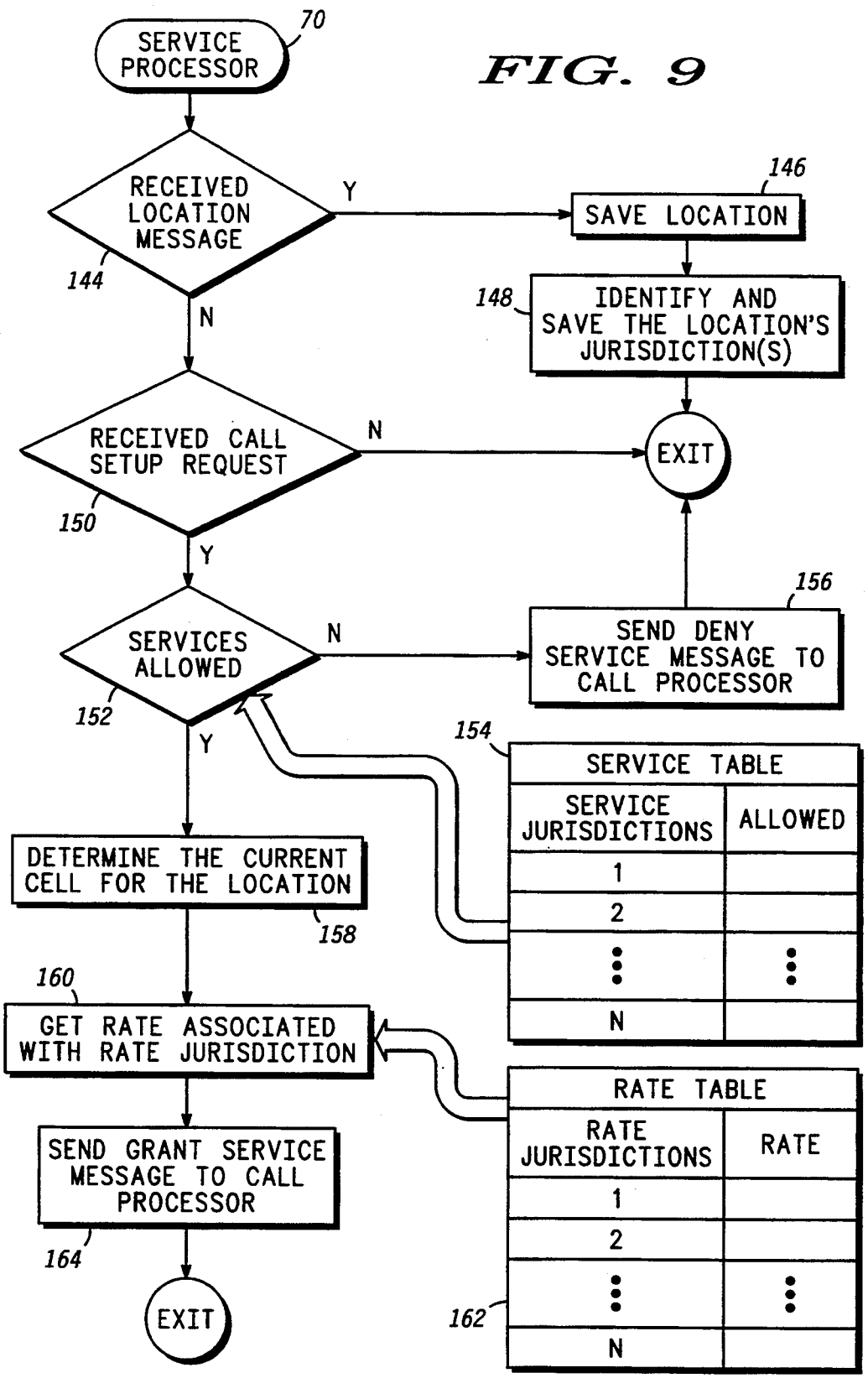
FIG. 9 shows a flow chart of tasks performed by a service processor portion of the radio telecommunications system.

FIGS. 4-5 and 9 depict processors 66, 68, and 70, respectively, which are implemented by nodes 48 within radio telecommunication system 10. Those skilled in the art will appreciate that the processors discussed below in connection with FIGS. 4-5 and 9 are controlled by programming instructions placed in a memory 58 of the node 48 where that processor may be located. Moreover, in the preferred embodiment of the present invention, all SUs 24, satellites 14, SOs 16, and SIMs 28 perform substantially the same processes as other SUs 24, satellites 14, SOs 16, and SIMs 28, respectively. Thus, while the description presented below is directed toward a single SU 24, a single satellite 14, a single SO 16, a single SIM 28, and a single call, the following description may be viewed as applying to all SUs 24, satellites 14, SOs 16, SIMs 28, and calls.

FIG. 4 shows a flow chart of tasks performed by measurement processor 66. The preferred embodiment of the present invention distributes the functions of measurement processor 66 between the communication node 48 (see FIG. 3) provided by satellite 14, hereinafter referred to as a locator unit 14, and SU 24, hereinafter referred to as a locatable unit 24. However, those skilled in the art could adapt measurement processor 66 to operate only at locator unit 14 or only at locatable unit 24 for other systems. Moreover, those skilled in the art will appreciate that in alternate embodiments of the present invention, a locator unit 14 may reside at a known position on the ground while a locatable unit may reside at an unknown position.

Radio telecommunications system 10 activates measurement processor 66 with respect to a single specific locatable unit 24 to obtain data which may be manipulated to determine the location of the locatable unit 24. Any one of several different events may lead to the activation of processor 66. For example, processor 66 may be automatically activated when a locatable unit 24 initially powers up, when a locatable unit 24 is requesting to setup a call to a called party, or when location processor 68, discussed below (see FIG. 5), requests its activation.

Measurement processor 66 operates while communications take place between locatable unit 24 and locator unit 14. As is conventional in cellular communications, these communications take place within a particular one of cells 34 (see FIG. 2). Once activated by locatable unit 24 accessing system 10, by locatable unit 24 attempting to setup a call to a called party, by an instruction from location processor 68 (see FIG. 5), or otherwise, processor 66 performs a task 74 to initialize a measurement record. This initialization may, for example, include the writing of an SU's ID and the ID of the cell 34 (see FIG. 2) within which communications are taking place to the measurement record along with other parameters, such as frequency or channel ID, that may describe the communications taking place between locator unit 14 and locatable unit 24.

After task 74, processor 66 performs a task 76 to determine the Doppler component of the frequencies used in communication channel 26 (see FIG. 1) for an electromagnetic signal traveling between locatable unit 24 and locator unit 14. This determination may, for example, be made by first synchronizing a frequency base used in locatable unit 24 to the frequency base of locator unit 14, then transmitting a signal from one of locator unit 14 and locatable unit 24 and receiving the signal at the other of locator unit 14 and locatable unit 24. The frequency of the received signal can then be measured to determine the frequency offset from a predetermined frequency. However, any alternate Doppler measurement technique known to those skilled in the art may be used as well. Task 76 then adds data describing the Doppler component to the measurement record.

In conjunction with task 76, or after task 76 as shown in FIG. 4, a task 78 determines signal propagation duration for the same or another electromagnetic signal communicated between locatable unit 24 and locator unit 14. As discussed above, this duration may be in the range of 2–3 msec or more. This determination may be made by first synchronizing a time base used in locatable unit 24 to the time base of locator unit 14, then transmitting a signal from one of locator unit 14 and locatable unit 24 and receiving the signal at the other of locator unit 14 and locatable unit 24. The received signal may then be measured to determine any temporal offset from a predetermined point in time. However, any alternate propagation delay measurement technique known to those skilled in the art may be used as well. Task 78 then adds data describing the propagation duration to the measurement record.

After task 78, a task 80 adds a time stamp to the measurement record. The time stamp defines the point in real time at which the measured communications characterized above in tasks 74 and 76 were taking place between locatable unit 24 and locator unit 14.

After task 80, a query task 82 determines whether to repeat measurements. Processor 66 may, for example, include a predetermined number of Doppler, propagation duration, and time stamp measurements in the measurement record. Alternatively, the number of measurements included may be a variable supplied to measurement processor 66 by the entity requesting activation of measurement processor 66. When measurements are to be repeated, program control loops back to task 76, discussed above. Processor 66 will then make another set of Doppler, propagation duration, and time stamp measurements with respect to another signal or set of signals communicated between locator unit 14 and locatable unit 24. Desirably, repeated measurements included within a single measurement record take place as rapidly as possible. For example, processor 66 may desirably make several measurements within several hundred milliseconds. The results from these several measurements may be averaged together to improve the accuracy with which the locatable unit's location is determined.

When task 82 determines that no more measurements are needed, a task 84 sends the measurement record to location processor 68 (see FIG. 5). The measurement record contains location parameters that location processor 68 uses to determine the location of locatable unit 24.

In the preferred embodiment, a location processor 68 resides in each SIM 28 (see FIG. 1). The particular SIM 28 which receives the measurement record is the home SIM 28 for the locatable unit 24 whose location is being determined. This particular home SIM 28 may be distinguished from other SIMs 28 through the locatable unit's ID. After task 84, program control exits measurement processor 66, and processor 66 becomes inactive. However, processor 66 may be reactivated at any time with respect to this or another locatable unit 24. Moreover, nothing prevents processor 66 from being configured in a reentrant fashion in locator unit 14 to simultaneously take measurements for more than one locatable unit 24 at a time.

FIG. 5 shows a flow chart of tasks performed by location processor 68. While location processors 68 are preferably implemented in SIMs 28, those skilled in the art could adapt location processors 68 for implementation in any other node 48 (see FIG. 3) of system 10, or an independent node (not shown) can be established to implement a single location processor 68 for the entire system 10 and all locatable units 24. Radio telecommunications system 10 activates location processor 68 with respect to a specific locatable unit 24 when a measurement record relating to that locatable unit 24 is received at the node 48 within which location processor 68 resides. Location processor 68 either forms a crude position estimate using the location parameters obtained in the measurement record, requests an additional measurement record, or refines a previous crude position into a usable location for the locatable unit 24.

In particular, location processor 68 performs a task 86 to determine one or more frequency of arrival parabolas to fit the Doppler component data contained in the measurement record. Since locator units 14 are orbiting the earth and locatable units 24 are located on or near the earth's surface, the direction with which a locator unit 14 moves with respect to a locatable unit 24 continually changes. Since this direction continually changes but locator unit orbital speed remains relatively constant, the component of locator unit velocity in a radial direction toward locatable unit 24 continually changes. As a result of the continual velocity change, the Doppler component continually changes relative to a stationary locatable unit 24 near the earth's surface.

On the other hand, a given Doppler component could be reported from any point located on a parabolic shape geographically centered generally about satellite ground track 36 (see FIG. 2) and extending away from the satellite 14. More precisely, the parabolic shape is symmetrical about an instantaneous total velocity vector $V_t$ that characterizes the relative velocity between the locator unit 14 and locatable unit 24. This total velocity vector $V_t$ characterizes the velocity which results from movement of locatable unit 24, movement of locator unit 14, and earth rotation.

Figure 6:
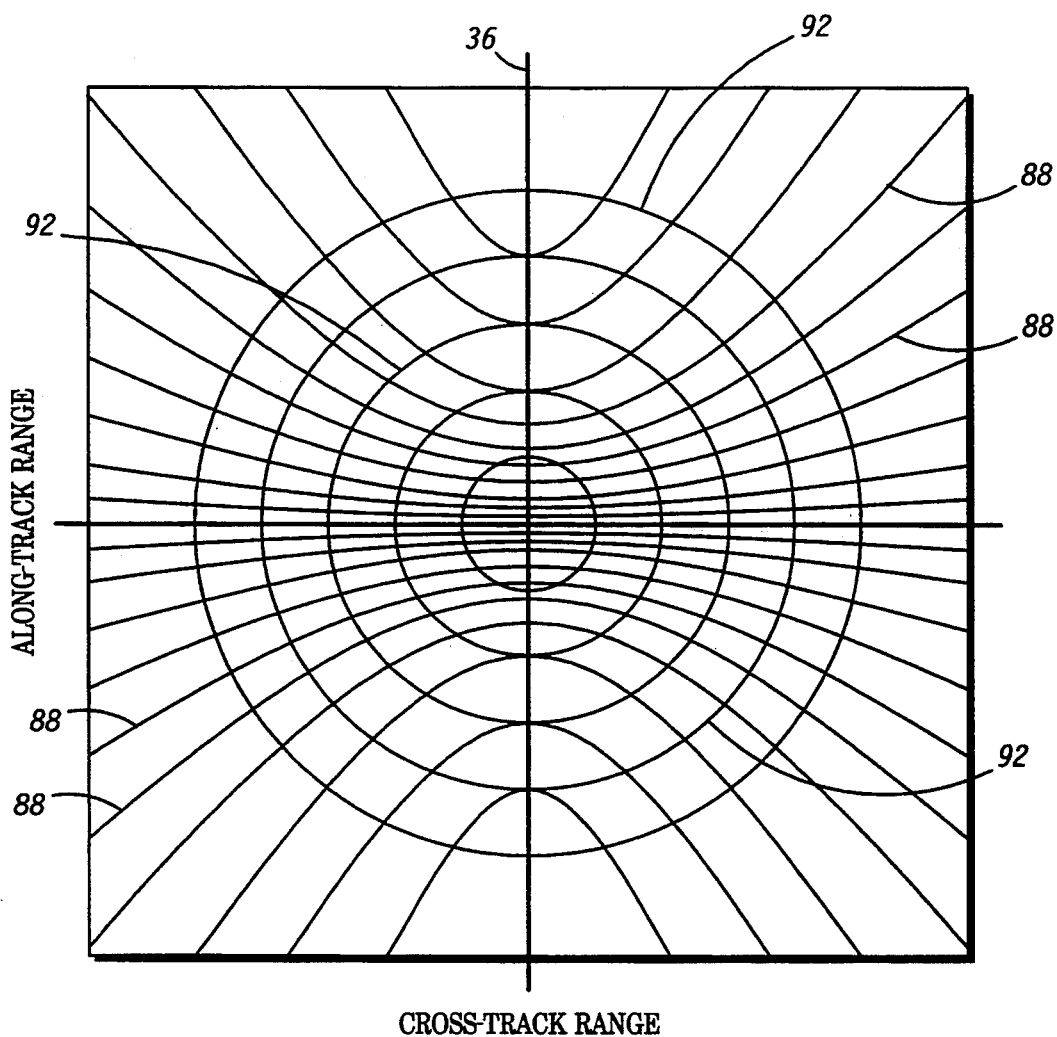
FIG. 6 graphically depicts constant Doppler and constant propagation duration curves which illustrate location determination in the radio telecommunications system.

FIG. 6 graphically depicts constant Doppler curves 88. As shown in FIG. 6, a given Doppler component may be graphically plotted on the surface of the earth (using a flat-earth approximation) as a parabola centered along the instantaneous total velocity vector $V_t$, which is approximated by ground track 36. The given Doppler component extends away from a locator unit 14. Higher Doppler rates result in thinner parabolas 88. At zero Doppler, which occurs when a locator unit 14 is directly overhead a locatable unit 24, the Doppler curve has an infinite width and resembles a straight line perpendicular to ground track 36. The frequency of arrival (FOA) parabola or curve determined in task 86 (see FIG. 5) represents the curve 88 that describes the Doppler component indicated in the measurement record. When the measurement record includes a plurality of measurements, task 86 may determine one FOA curve 88 for each measurement. The FOA curves 88 for each measurement should reside near one another due to the plurality of measurements being made within a short period of time. Alternatively, task 86 may average the plurality of Doppler component measurements included in a single measurement record to obtain a single FOA curve 88 which represents all measurements in the measurement record. This average should include offsets due to the earth's rotation.

Those skilled in the art will appreciate that the actual measured Doppler will characterize movement of locatable unit 24 as well as movement of locator unit 14 and earth rotation. Radio telecommunications system 10 permits locatable units 24 to move. However, due to the low earth orbits of locator units 14, locator units 14 move at a much greater speed than is possible for locatable units 24. Likewise, the earth's rotation rate is greater than locatable unit speed for the vast majority of human activities taking place on the earth. Consequently, the speed or movement of locatable units 24 may be ignored for the purposes of this discussion.

Moreover, those skilled in the art will appreciate that a constant Doppler curve in three-dimensional space is actually a hollow, three-dimensional parabola, or paraboloid. With reference back to FIG. 5, the results of task 86 need not describe the perimeter of this paraboloid but rather the two-dimensional intersection of this paraboloid on the surface of the earth. For convenience, the constant Doppler curves 88 shown in FIG. 6 ignore the minor distortion in shape caused by the curvature of the earth.

While the preferred embodiment of the present invention directly uses Doppler components, those skilled in the art will appreciate that Doppler may be used indirectly to identify other location curves. For example, those skilled in the art will appreciate that the above-described orbital geometry produces a Doppler component which changes in time. Nothing prevents detecting Doppler change and fitting curves to Doppler change rather than direct Doppler. Those skilled in the art will understand that the term Doppler as used herein is intended to encompass all such indirect usages of Doppler as well as direct usage of Doppler.

After task 86 determines the frequency of arrival parabola on the surface of the earth, a task 90 determines a time of arrival circle which fits the propagation duration data contained in the measurement record. Since electromagnetic signals propagate through the atmosphere at a constant velocity of approximately the speed of light, a given propagation duration dictates that the source of a signal responsible for the propagation duration must reside on the surface of a sphere having a radius approximately equal to the propagation duration times the speed of light and centered at the point where the signal is received. In the present invention, the source of an electromagnetic signal may be a locatable unit 24 residing on or near the surface of the earth and the signal may be received at a locator unit 14 orbiting the earth. Thus, a time of arrival circle represents the intersection of a sphere, centered at locator unit 14 and having a radius equivalent to the speed of light times the propagation duration, with the earth's surface.

FIG. 6 graphically depicts constant time of arrival (TOA) circles 92. As shown in FIG. 6, a given propagation duration may be graphically plotted on the surface of the earth as a circle centered at the point on ground track 36 where the locator unit's nadir direction intersects the surface of the earth. Longer propagation durations result in circles having larger radii. The TOA curve determined in task 90 (see FIG. 5) represents the circle 92 that describes the propagation duration indicated in the measurement record.

When the measurement record includes a plurality of measurements, task 90 may determine one TOA curve 92 for each measurement. These plurality of curves 92 should reside near one another due to the plurality of measurements being made within a short period of time. Alternatively, task 90 may average the plurality of propagation duration measurements included in a single measurement record to obtain a single TOA curve 92 which represents all measurements in the measurement record.

The intersection of FOA curve 88 determined in task 86 with the TOA curve 92 determined in task 90 provides a two-position solution to the location determination problem, as graphically illustrated in FIG. 6. Of course, when tasks 86 and 90 determine a plurality of FOA curves 88 and TOA curves 92, respectively, corresponding to a plurality of measurements included in the measurement record, a plurality of two-position solutions will result. One position from each two-position solution resides to the right of satellite ground track 36 and the other resides to the left of satellite ground track 36. Regardless of whether left or right, one resides to the east of the total velocity vector $V_t$, and one resides to the west of the total velocity vector $V_t$. Of course, the two-position solution is ambiguous because only one of these two solutions is correct. In other words, one of the two positions is the actual position for locatable unit 24 and the other position is an image of the actual position.

Referring back to FIG. 5, after tasks 86 and 90 have determined frequency and time of arrival curves 88 and 92, a procedure 94 resolves the ambiguity presented by the two-position solution. Resolve ambiguity procedure 94 is discussed in detail below in connection with FIG. 7. In general, procedure 94 selects one of the two positions as a crude position that describes the location of locatable unit 24. Moreover, the crude position is specified in terms relative to locator unit 14.

Thus, after completion of procedure 94, a task 96 translates the crude position from coordinates based on locator unit 14 into earth coordinates, such as latitude and longitude. Since locator unit 14 travels in a predictable orbit, this translation may take place by consulting an ephemeris table 98, a block diagram of which is illustrated in FIG. 5. Ephemeris table 98 may be retained in memory 58 (see FIG. 3) of the node 48 (see FIG. 3) which implements location processor 68. Table 98 assigns earth coordinates for locator units 14 as a function of time. By using the satellite ID and time stamp data location parameters from the measurement record, and by applying conventional orbital geometry, task 96 may assign earth coordinates to the crude position.

In an alternate embodiment, the FOA curve 88 and TOA circle 92 may be translated directly into earth coordinates during tasks 86 and 90. Thus, the crude position obtained from procedure 94 would automatically be defined in terms of earth coordinates, and task 96 would not need to perform a translation.

The accuracy of the crude position selected through procedure 94 may or may not be sufficient for the purposes of system 10. Many factors may contribute to inaccuracies. For example, the specific designs used in locator units 14 and locatable units 24 contribute to the degree of accuracy with which the crude position defines an actual location for locatable unit 24. The accuracy with which Doppler component, propagation duration, and real time can be measured contributes to the accuracy of the location parameters upon which the crude position is based. These factors are, for the most part, random errors that can be expressed through standard deviations or other statistical variance terms. Such variance terms are substantially constant from measurement record to measurement record. They may be determined mathematically from design parameters for locatable unit 24 and locator unit 14, or they may be determined empirically.

Other accuracy factors relate to the nature of FOA and TOA curves 88 and 92, shown in FIG. 6. Referring briefly to FIG. 6, at locations where FOA parabolas 88 intersect TOA circles 92 at nearly right angles, small errors in Doppler component or propagation duration measurements result in small geographic location errors. These locations are found further away from the point where the locator unit's nadir direction intersects the surface of the earth, particularly to the left and right of ground track 36. The more tangential the FOA parabolas are to an intersecting TOA circle, the greater the geolocation error which results from small measurement errors. Moreover, the error is typically greater in a direction perpendicular to ground track 36 than in a direction parallel to ground track 36. These factors vary in accordance with the position of locatable unit 24 relative to locator unit 14. Together, all the accuracy factors suggest that the crude position probably does not describe the actual location for locatable unit 24, but that the actual location resides somewhere close to the crude position.

Referring back to FIG. 5, location processor 68 may make more than one crude position determination for any locatable unit 24 before concluding that sufficient accuracy has been achieved. Additional location determinations are performed through repetitions or reactivations of location processor 68 to process additional measurement records constructed for the same locatable unit 24.

Thus, location processor 68 may perform a task 100 to average the crude position obtained above in task 96 for the current repetition of location processor 68 with any prior crude positions obtained in prior repetitions of location processor 68. The averaging of crude positions determined from a plurality of location parameter sets refines the definition of the crude position and further reduces inaccuracies associated with the crude position. Of course, those skilled in the art will appreciate that such averaging may alternatively take place above in task 86, task 90, and procedure 94 as well. The averaging of results from additional iterations of the location process causes the location accuracy to improve in a manner well known to those skilled in the art.

By averaging a plurality of crude positions obtained from a plurality of location parameter sets, those skilled in the art will appreciate that a wide variety of "averaging" techniques are contemplated by the present invention. For example, the preferred embodiments average crude positions through the use of well known minimum least squares error or maximum likelihood curve fitting techniques. However, those skilled in the art may devise other averaging techniques to cause a plurality of error-prone location parameter measurements to converge on a solution for the actual location of locatable unit 24.

After task 100, a task 102 obtains an error estimate or definition to associate with the crude position determined so far by location processor 68. This error definition is a function of the current crude position relative to locator unit 14, the variance terms that characterize the location parameters, and the number of location parameter measurements processed by various repetitions of location processor 68. The error definition resembles an ellipse (not shown). This error ellipse is centered at the crude position. At positions relative to locator unit 14 where error is minimal, the ellipse is more circular and covers a relatively small area. At positions relative to locator unit 14 where error is greater, the ellipse's area increases and its shape becomes more flattened, with a major axis extending perpendicular to the ground track 36. The error definition may be obtained by a table look-up operation using data describing the relative location of the crude position to locator unit 14 and the number of location parameter sets that have been averaged to result in a current, more refined, crude position.

After task 102, a task 104 compares the error definition with a predetermined position accuracy requirement. The position accuracy error is determined by system constraints. Position accuracy may be defined as a circle, such as a circular error probability (CEP), centered at the crude position, and having a radius of a predetermined distance. Task 104 compares the area of the error definition ellipse with the area of the position accuracy circle.

Next, a query task 106 determines whether the error is less than the position accuracy. The error is less if a predetermined percentage of the area of the error ellipse fits within the position accuracy circle. However, other statistical curve-fitting techniques may be applied as well. Thus, task 106 decides whether to further refine the definition of the crude position. Further refinement is needed unless the area of the error ellipse is sufficiently confined within the position accuracy circle.

If the error is not less than the allowable error, a task 108 saves the current location and crude position parameters for averaging with future measurements in a future iteration of location processor 68 with respect to the locatable unit 24. Next, a task 110 sends a message to measurement processor 66 (see FIG. 4) to instruct it to take additional measurements and return another measurement record. After task 110, program control exits location processor 68, and location processor 68 becomes temporarily inactive with respect to the locatable unit 24 and this location determination. However, when the next measurement record is received for the locatable unit 24 at the node 48 where location processor 68 resides, location processor 68 reactivates. As discussed above, location processor 68 will refine the definition of the crude position through a curve-fitting statistical averaging technique. This refinement will cause the area of the error ellipse to shrink while slightly altering the definition of the crude position.

At some future iteration of location processor 68 with respect to locatable unit 24 the error ellipse will shrink to a point where task 106 will determine that the error is less than the position accuracy. At this point, system 10 requires no further refinement of the crude position. Thus, a task 112 sends the crude position to service processor 70 (see FIG. 9), discussed below, in a location-determined message. At this point, this location determination is complete, the crude position is now considered as the location for locatable unit 24, and program control exits. Location processor 68 again becomes inactive. However, location processor 68 reactivates for other location determinations, whether for this or other locatable units 24.

Figure 7:
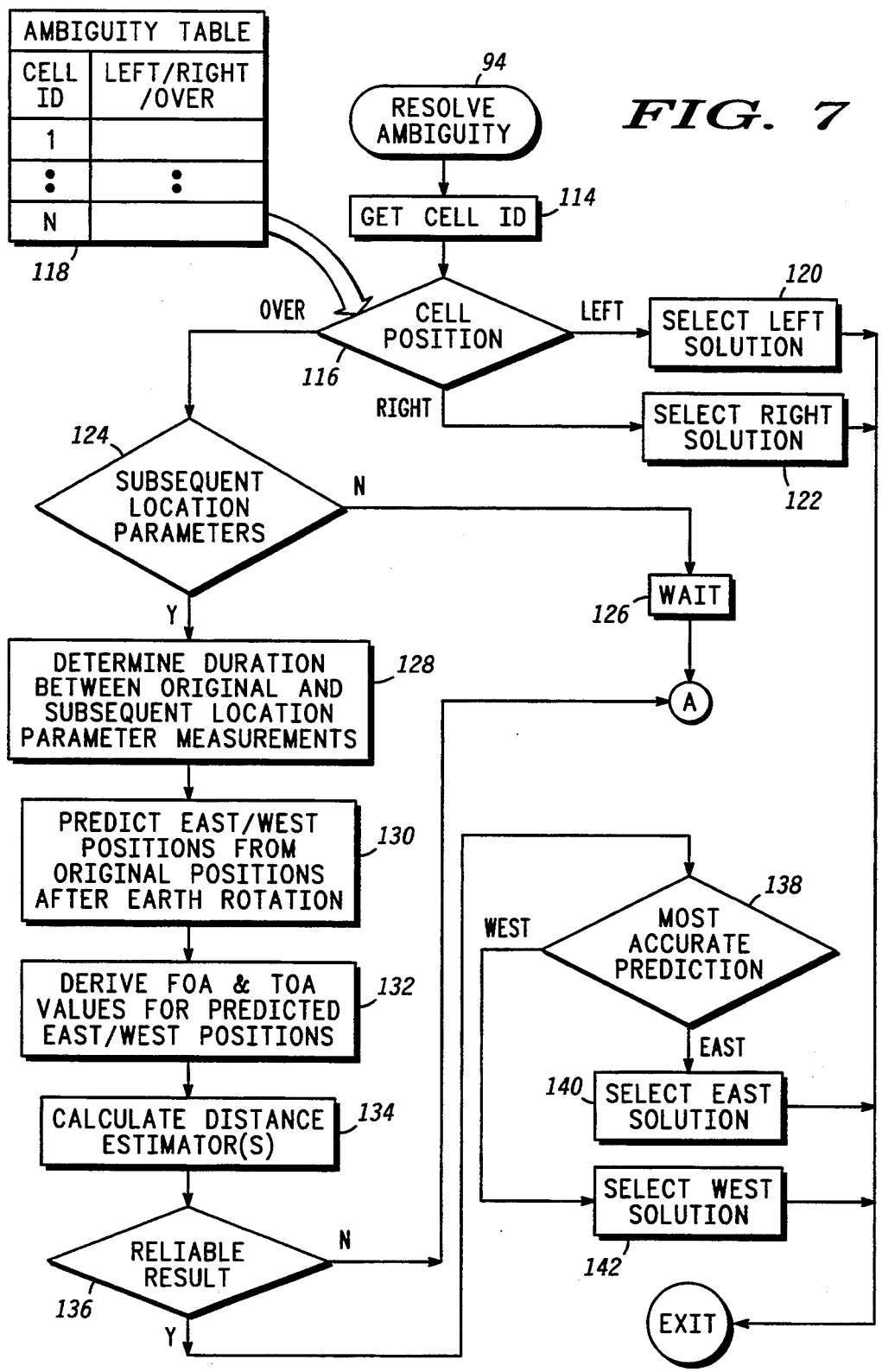
FIG. 7 shows a flow chart of tasks performed by a resolve ambiguity procedure performed by the location processor portion of the radio telecommunications system.

As discussed above, procedure 94 resolves the ambiguity posed by the intersection of FOA curve 88 with a TOA curve 92. FIG. 7 shows a flow chart of tasks performed by location processor 68 during procedure 94 to select one of two solutions that are equally credible based upon FOA and TOA curves alone. Procedure 94 may perform a task 114 to get a cell ID from the measurement record. This cell ID identifies the cell within which communications were conducted in accordance with measurement processor 66 (see FIG. 4). With reference back to FIG. 2, each of cells 34 projected by satellite 14 has a unique ID associated with it. A first portion of these cells 34 resides to the right of ground track 36, a second portion of these cells 34 resides to the left of ground track 36, and a third portion of these cells 34 resides over ground track 36.

Referring back to FIG. 7, after task 114 obtains a cell ID, a query task 116 determines the position of the cell relative to ground track 36. Task 116 may consult an ambiguity table 118, a block diagram of which is shown in FIG. 7, to make this determination. Table 118 is constructed to associate left-of-ground-track, right-of-ground-track, and over-ground-track status indications with each cell 34 included in a footprint 30 (see FIG. 2). Table 118 may be stored in memory 58 (see FIG. 3) of the node 48 (see FIG. 3) within which location processor 68 resides. Using the cell ID location parameter included in the measurement record, task 116 can look up a left/right/over status indication in table 118.

With the status indication from table 118, procedure 94 performs a task 120 when the cell's ID indicates communications took place within a cell to the left of ground track 36 and a task 122 when communications were within a cell to the right of ground track 36. As discussed above, FOA curves 88 (see FIG. 6) are symmetrical about a total velocity vector $V_t$ that is approximated by ground track 36. Thus, one solution resides to the left of ground track 36 and the other solution resides to the right of ground track 36. Consequently, task 120 causes procedure 94 and location processor 68 (see FIG. 5) to select the left solution while task 122 selects the right solution. After tasks 120 or 122, program control exits procedure 94 and returns to task 96 in location processor 68 (see FIG. 5).

For situations where communications occur in clearly left or right of ground track cells, the ambiguity is resolved quickly and with a minimal amount of processing. A clear majority of cells 34 resides either to the left or right of ground track 36. Thus, for a clear majority of situations, ambiguity may be resolved quickly and easily.

On the other hand, in a minority of situations, communications occur in cells 34 located on or near ground track 36. In these situations, each of the two solutions provided from the intersection of an FOA curve 88 (see FIG. 6) with a TOA curve 92 (see FIG. 6) resides either in a single common cell 34, such as cell "7" in FIG. 2, or two adjacent cells 34, such as cells "2" and "3" in FIG. 2. The closely spaced relationship between the two solutions results from the symmetry of FOA curves 88 (see FIG. 6) about the total velocity vector $V_t$. When communications take place in cells 34 which are deemed to reside over ground track 36, cell ID does not provide sufficient resolution to distinguish between an actual position and an image position.

Accordingly, when cell ID indicates that communications took place in a cell 34 residing over ground track 36, procedure 94 performs a query task 124. Likewise, in alternate embodiments where a locator unit has only a single antenna which produces a single beam or cell, no call position information suggests a left or right solution and the process initiated at task 124 can be used to resolve ambiguity. Task 124 determines whether the measurement record currently being processed by location processor 68 (see FIG. 5) and procedure 94 describes a set of original location parameters or a set of subsequent location parameters. As discussed above, location processor 68 is performed in an iterative fashion until a final location for the locatable unit is resolved. Original location parameters are presented in the first measurement record sent to location processor 68 for a given locatable unit 24. Any subsequent measurement record sent to location processor 68 for the same locatable unit 24 before the locatable unit's location has been finally resolved includes subsequent location parameters.

When the current measurement record carries original location parameters, procedure 94 may perform an optional task 126. Task 126 causes procedure 94 to wait before proceeding. After task 126 waits a predetermined duration, program control proceeds, through connector "A", to task 108 shown in FIG. 5. As discussed above, task 108 and the following task 110 cause the current location parameters to be saved for future use and cause measurement processor 66 (see FIG. 4) to make additional measurements and return another measurement record.

Task 126 causes a predetermined minimum duration to transpire between activations of measurement processor 66. Preferably, this minimum duration is on the order of a few seconds and is much larger than the duration between successive measurements potentially included in a single measurement record. Of course, those skilled in the art will appreciate that task 126 may be omitted if system delays impose the few second delay without including task 126. Alternatively, the message sent to measurement processor 66 (see FIG. 4) in task 110 (see FIG. 5) may instruct measurement processor 66 to take measurements at a specified time.

Figure 8:
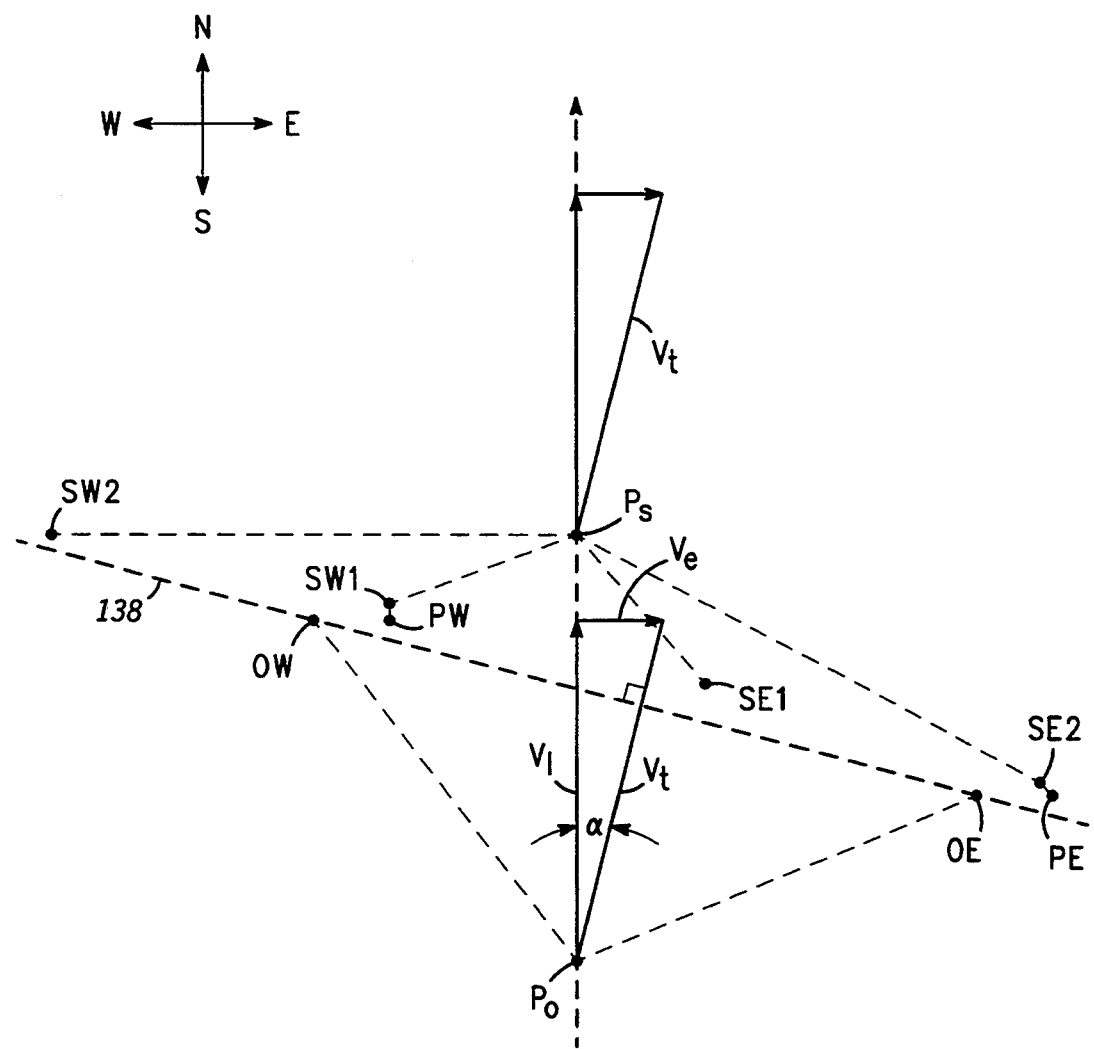
FIG. 8 graphically depicts an example of ambiguity resolution in the radio telecommunications system.

When task 124 discovers that the current measurement record includes a set of subsequent location parameters, procedure 94 processes the original and subsequent location parameters in a manner discussed below. FIG. 8 graphically illustrates an example scenario of the technique used by procedure 94. As shown in FIG. 8, the set of original location parameters was obtained when a locator unit 14 was positioned over a point $P_o$. From point $P_o$ the intersection of an FOA curve 88 (see FIG. 6) and a TOA curve 92 (see FIG. 6) produces a two-position solution including an original west (OW) position and an original east (OE) position. Positions OW and OE are equal distant from point $P_o$ and symmetrical about the instantaneous total velocity vector $V_t$ for point $P_o$. Reference line 138 is perpendicular to vector $V_t$ for convenience in illustrating this symmetry. As discussed above, the instantaneous total velocity vector $V_t$ has two components, ignoring movement of locatable unit 24. These two components are the velocity of locator unit 14 $V_l$, which is moving north in the example scenario illustrated in FIG. 8, and the velocity of the earth $V_e$, which moves east. The vector $V_e$ is produced by the daily rotation of the earth.

When locator unit 14 moves at a speed of around 25,000 Km/Hr, the rotational speed of the earth creates an angle between vectors $V_l$ and $V_e$. Angle has a magnitude of around 3.6@ at the equator and around 1.8@ at 60@ latitude. At the equator, over a given duration, locator unit 14 moves north a given distance while the surface of the earth rotates approximately 1/24 of the given distance east. At 60@ latitude the earth's surface rotates east approximately 1/48 of the distance that a locator unit 14 moves north. Those skilled in the art will appreciate that FIG. 8 exaggerates angle to clarify the relationships between these velocities.

With locatable unit 24 located on or near the surface of the earth, the movement of locatable unit 24 is influenced by earth rotation. Thus, both locatable unit 24 and the actual position from the two-position solution move east as locator unit 14 moves around the earth in a north-south orbit of constellation 12 (see FIG. 1). Due to the symmetry of the image position with the actual position about the total velocity vector $V_t$, the image position moves west over time due to earth rotation.

With reference to both FIGS. 7 and 8, procedure 94 performs a task 128 when a set of subsequent location parameters arrive. Task 128 determines the actual duration that transpired between corresponding original and subsequent location parameter measurements. This determination may be made be examining time stamp data included in the measurement record.

After task 128, a task 130 makes a prediction with respect to the original east position OE and to the original west position OW included in the two-position solution obtained from the set of original location parameters. This prediction assumes that each of the east and west positions were actual, not image, positions. Of course, one of these assumptions is in error. Task 130 then determines predicted west and predicted east positions (PW and PE) expected to correspond to the subsequent location parameters based on these assumptions.

Predicted west and predicted east positions PW and PE are both located to the east of original west and original east positions OW and OE, respectively. Predicted west position PW resides to the east of original west position OW by a distance equivalent to the rotational rate of the earth at the approximate latitude where positions OW and OE are located times the duration determined above in task 128. Predicted east position PE resides to the east of original east position OE by a distance equivalent to the rotational rate of the earth times the duration determined above in task 128. In other words, predicted positions PW and PE reside where positions OW and OE, respectively, should be located after the earth rotates for the duration determined above in task 128.

After task 130, a task 132 derives the FOA and TOA values which correspond to predicted west and predicted east positions PW and PE. The FOA and TOA values are different between positions PW and PE because the PW position moves toward the line of symmetry provided by total velocity vector $V_t$ while the PE position moves away from the line of symmetry. Likewise, position PW moves closer to locator unit 14 while position PE moves farther away from locator unit 14.

After task 132, a task 134 calculates one or more distance estimators which compare the subsequent FOA and TOA location parameters with the predicted FOA and TOA values. The subsequent location parameters were measured after locator unit 14 moved to a new position, illustrated as position $P_s$ in FIG. 8. Two situations are possible. Subsequent west and subsequent east positions SW1 and SE1 illustrate a first situation. Subsequent west and subsequent east positions SW2 and SE2 illustrate a second situation. The subsequent location parameters will resemble only one of these situations, not both.

In the first situation, original west position OW was the actual position while original east position OE was the image position. In this first situation predicted west position PW should reside near subsequent west position SW1 while predicted east position PE should reside a far distance from subsequent east position SE1. The FOA curve 88 (see FIG. 6) requirement of symmetry about total velocity vector $V_t$ and the TOA curve 92 (see FIG. 6) requirement of equal distances from position $P_s$ cause the image position to move west while the actual position moves east.

In the second situation, original east position OE was the actual position while original west position OW was the image position. In this second situation predicted east position PE should reside near subsequent east position SE2 while predicted west position PW should reside a far distance from subsequent west position SW2. In other words, the image position moves west while the actual position moves east.

In the preferred embodiment of the present invention, task 134 uses a weighted least squares distance estimation technique, which is well known to those skilled in the art. The weighted least squares estimator uses variance terms that characterize random errors in location parameters. These variances may be determined mathematically given the design of locator unit 14 and locatable unit 24 or they may be determined empirically. However, those skilled in the art may devise other estimators which will determine which of the original positions appears to move in a generally eastward direction over time.

After task 134, a query task 136 determines whether the result obtained above in task 134 is reliable. In other words, task 136 determines whether sufficient confidence can be obtained from the distance estimations calculated in task 134. In the preferred embodiment, the magnitude of a weighted least squares estimator is compared with a predetermined value to make this determination. If the result is not sufficiently reliable, program control proceeds, through connector "A", to tasks 108 and 110 (see FIG. 5). Tasks 108 and 110 will cause another set of subsequent location parameters to be obtained. Due to the data present in additional measurements and the lengthening duration transpiring from the set of original location parameters, the statistical significance and reliability of a distance estimate will improve with the next set of subsequent location parameters.

When task 136 determines that a reliable result has been obtained, a query task 138 determines which of the predicted west and predicted east positions PW and PE was the most accurate prediction. When the distance estimator indicates that the predicted east position PE was the most accurate, a task 140 selects the east solution to the ambiguity problem. When the distance estimator indicates that the predicted west position PW was the most accurate, a task 142 selects the west solution to the ambiguity problem. After tasks 140 or 142, program control exits procedure 94 and proceeds to task 96 in location processor 68.

While FIG. 8 illustrates a situation relying upon two, two-position solutions, those skilled in the art will appreciate that many variations are possible. For example, the subsequent set of location parameters may rely upon either one of FOA or TOA values rather than both to determine which of the original east OE and original west OW positions appears to move east. However, the confidence obtained from basing a decision at task 138 upon less data is decreased and additional measurements may be required.

On the other hand, each measurement record may, as discussed above, include several measurements therein. Each of the several measurements included in the set of original location parameters may be used in forming predictions and each of the several measurements included in the set of subsequent location parameters may be used in determining which prediction from original west positions or original east positions more closely resemble subsequent measurements. Improved reliability will result because the original positions and the subsequent positions will be described with more accuracy through the plurality of measurements.

In fact, for a given number of measurements, greater reliability results from concentrating the measurements at original and subsequent positions rather than distributing the measurements in time between the original and subsequent positions. This results because greater time between original and subsequent positions allows the earth to rotate further. Compared to measurements made when the earth rotates further, measurements made when the earth rotates less have little influence over the reliability of decisions made using only the later measurements.

The processes and procedures discussed above in connection with FIGS. 5 and 7 require additional measurement records to be obtained in various situations so that location processor 68 converges upon an acceptably accurate, unambiguous location solution in an iterative fashion. As discussed above, less error is associated with locations that reside further away from ground track 36 (see FIGS. 2 and 6). Moreover, the likelihood of resolving ambiguity through cell IDs rather than from processing additional measurement records increases further away from ground track 36. Accordingly, a great likelihood exists that when extra measurements are needed for ambiguity resolution, those same extra measurements are also needed to achieve required position accuracy. Hence, ambiguity resolution is achieved without requiring additional delay beyond that needed to achieve a required position accuracy, and vice versa.

FIG. 9 shows a flow chart of tasks performed by service processor 70. The preferred embodiment of the present invention implements a service processor 70 in each SIM 28 (see FIG. 1). In particular, the home SIM 28 for a locatable unit 24 implements service processor 70 for that locatable unit 24. However, those skilled in the art could adapt service processor 70 for implementation in any other node 48 (see FIG. 3) of system 10, or an independent node (not shown) can be established to implement a single service processor 70 for the entire system 10. Generally speaking, service processor 70 qualifies communication services provided by system 10 to the locatable unit 24 and its user in response to the locatable unit's location as indicated in the location-determined message prepared and sent in task 112 (see FIG. 5).

Radio telecommunications system 10 activates service processor 70 with respect to a single specific locatable unit 24 when a location-determined message relating to that locatable unit 24 is received at the node 48 within which service processor 70 resides. In addition, service processor 70 is activated when a message requesting a call setup involving that locatable unit 24 is received. This node 48 may be the same node 48 which implements location processor 68 (see FIG. 5), and the location-determined message may be delivered by placing the message in an appropriate queue being managed in memory 58 of that node 48.

In particular, service processor 70 performs a query task 144 to determine whether a location-determined message has been received. If a location-determined message has been received, a task 146 saves the location data contained in the message in association with the locatable unit 24 to which the location relates. After task 146, a task 148 identifies all relevant jurisdictions, discussed above in connection with FIG. 2, within whose domains the location resides. The jurisdictions may be geopolitical jurisdictions, rate jurisdictions, feature jurisdictions, and the like. When the jurisdictions are identified, IDs associated with the relevant jurisdictions are saved in association with the locatable unit 24 to which the location relates for future use by service processor 70. After task 148, program control exits service processor 70, and service processor 70 becomes inactive. However, service processor 70 will activate again with respect to this locatable unit 24 when a call setup involving this locatable unit 24 is requested.

A subsequent activation of service processor 70 may be detected when task 144 determines that a location message has not been received. In this situation, a query task 150 determines whether a call setup request message has been received at service processor 70 with respect to the locatable unit 24. The call setup request message is received when someone is attempting to setup a call involving the locatable unit 24. The locatable unit 24 may be either a calling party or a called party. If a call setup request message has not been received, program control exits service processor 70, and service processor 70 becomes inactive.

When a call setup request message is received, a query task 152 determines whether communication services are allowed for the locatable unit 24. In deciding whether communication services are allowed for the locatable unit 24, task 152 may consult a service table 154 stored in memory 58 of the node 48 which implements service processor 70. Service table 154 associates service jurisdictions with indications of whether communication services are allowed or not. The service jurisdictions may, for example, be geopolitical jurisdictions. These jurisdictions were identified above in connection with task 148.

If communication services are not allowed, a task 156 is performed to send a deny service message to the call processor (not shown) which sent the call setup request message to service processor 70. The call processor will take appropriate steps to realize the qualification to communication services indicated through task 156. After task 156, program control exits service processor 70, and service processor 70 becomes inactive.

If task 152 determines that communication services are allowed, a task 158 determines the current locator unit 14 and cell 34 that cover the location saved above in task 146 for this locatable unit 24 during a previous activation of service processor 70. This locator unit 14 and cell 34 may be different from the locator unit 14 and cell 34 which were involved in location determination, discussed above, due to the movement of locator units 14. This determination may be made by applying the current time and the location saved above in task 146 to the orbital geometry associated with constellation 12 (see FIG. 1) of locator units 14.

After task 158, a task 160 gets a call rate to be used for the upcoming call. Task 160 may consult a rate table 162 stored in memory 58 of the node 48 which implements service processor 70. Rate table 162 associates rate jurisdictions with rate descriptions. Any rate description conventional in the art of telephony is contemplated for rate table 162. Such rate descriptions may be complex formulas which vary rates depending on time of day, direction of call, number of minutes over which a call takes place, and the like. These rate jurisdictions were identified above in connection with task 148. They may or may not correspond to the service jurisdictions discussed above in connection with task 152.

After task 160, a task 164 sends a grant service message to the call processor (not shown) that sent the call setup request message to service processor 70. In addition, if locatable unit 24 is the called party, task 164 may send the grant service message to a call processor (not shown) that is serving locatable unit 24. This called-party call processor may be identified by the location information saved in task 146 or by a jurisdiction identified above in task 148.

The grant service message will include the cell ID, and rate data determined above in tasks 158 and 160. The call processor will continue setting up the requested call in a manner consistent with conventional telephony techniques. The communication services provided by system 10 throughout the call will be qualified through the rate data included in the grant service message. After task 164, the communication services to be offered for the call have been qualified in response to the locatable unit's location, and program control exits service processor 70. Service processor 70 again becomes inactive. However, service processor 70 reactivates for other location-determined messages or other call setup request messages, whether for this or other locatable units 24. While the service processor 70 discussed above qualifies communication services based on a locatable unit's location, nothing prevents other processors from qualifying communication services based on other factors, such as payment of accounts. Alternatively, service processor 70 may be expanded to qualify communication services based on such other factors as well as an SU's location.

In summary, the present invention provides an improved location determination system and method which are suitable for use in a radio telecommunications system. The system and method of the present invention automatically determine locations for locatable subscriber units. A subscriber unit's location is determined using a locator satellite which orbits the earth in a low earth orbit. No more than one satellite needs to be used to determine a subscriber unit's location. Moreover, the low earth orbit is advantageous for communications because lower power subscriber units may be used and spectrum may be reused more efficiently.

The location system of the present invention measures characteristics, such as Doppler and propagation duration, of a first signal communicated between a single subscriber unit and a single satellite. These measurements yield a two-position location solution. Measured characteristics of a second communicated signal may be processed to select an actual position and reject an image position. The actual position is selected due to the location system's ability to detect earth rotation.

The present invention has been described above with reference to preferred embodiments. However, those skilled in the art will recognize that changes and modifications may be made in these preferred embodiments without departing from the scope of the present invention. For example, those skilled in the art will appreciate that the flow charts presented herein are intended to teach the present invention and that different techniques for implementing program flow that do not necessarily lend themselves to flowcharting may be devised. In particular, each task discussed herein may be interrupted to permit program flow to perform background or other tasks. In addition, the specific order of tasks may be changed, and the specific techniques used to implement the tasks may differ from system to system. These and other changes and modifications which are obvious to those skilled in the art are intended to be included within the scope of the present invention.

What is claimed is:

1. A method of distinguishing an actual position from an image position in a location determination system, said method comprising the steps of:
    obtaining a set of original location parameters, said original set describing a first position and a second position;
    acquiring a set of subsequent location parameters; and
    selecting, as said actual position, the one of said first and second positions which, in response to said sets of original and subsequent location parameters, appears to move in a generally eastward direction over time.

2. A method of distinguishing an actual position from an image position as claimed in claim 1 wherein said set of original location parameters is obtained from communications conducted between a locator unit and a locatable unit which move relative to one another, and said obtaining step comprises the steps of:
    transmitting an electromagnetic signal from one of said locator unit and said locatable unit to the other of said locator and locatable units;
    determining a Doppler component of said signal; and
    including said Doppler component in said set of original location parameters.

3. A method of distinguishing an actual position from an image position as claimed in claim 1 wherein said set of original location parameters is obtained from communications conducted between a locator unit and a locatable unit which move relative to one another, and said obtaining step comprises the steps of:
    determining a duration required for said signal to propagate between said locator and locatable units; and including said propagation duration in said set of original location parameters.

4. A method of distinguishing an actual position from an image position as claimed in claim 2 wherein said acquiring step comprises the steps of:
    transmitting a subsequent electromagnetic signal from one of said locator unit and said locatable unit to the other of said locator and locatable units;
    determining a Doppler component of said subsequent signal; and
    including said Doppler component of said subsequent signal in said set of subsequent location parameters.

5. A method of distinguishing an actual position from an image position as claimed in claim 2 wherein said locator unit and said locatable unit are spaced apart from one another, and said obtaining step additionally comprises the steps of:
    determining a duration required for said signal to propagate between said locator and locatable units; and
    including said propagation duration in said set of original location parameters.

6. A method of distinguishing an actual position from an image position as claimed in claim 5 wherein said acquiring step comprises the steps of:
    transmitting a subsequent electromagnetic signal from one of said locator unit and said locatable unit to the other of said locator and locatable units;
    determining a Doppler component of said subsequent signal; and
    including said Doppler component of said subsequent signal in said set of subsequent location parameters.

7. A method of distinguishing an actual position from an image position as claimed in claim 6 wherein said acquiring step additionally comprises the steps of:
    determining a duration required for said subsequent signal to propagate between said locator and locatable units; and
    including said propagation duration of said subsequent signal in said set of subsequent location parameters.

8. A method of distinguishing an actual position from an image position as claimed in claim 1 wherein:
    said obtaining step comprises the step of measuring characteristics of a plurality of original electromagnetic signals communicated between a locator unit and a locatable unit, said plurality of original signals being communicated within a relatively short period of time;

said acquiring step comprises the step of measuring characteristics of a plurality of subsequent electromagnetic signals communicated between said locator and locatable units, said plurality of subsequent signals being communicated within a relatively short period of time; and said method additionally comprises the step of waiting a relatively long period of time, compared to said periods of time over which said original and subsequent signals are communicated, between said obtaining and acquiring steps.

9. A method of distinguishing an actual position from an image position as claimed in claim 1 wherein said actual position appears to move in said generally eastward direction over time as a result of earth rotation, and said method additionally comprises, prior to said selecting step, the steps of:

predicting a location of a third position that differs from one of said first and second positions by a direction and distance which are responsive to earth rotation; and determining whether said set of subsequent location parameters corresponds to said third position.

10. A method of distinguishing an actual position from an image position as claimed in claim 9 wherein said method additionally comprises, prior to said selecting step, the step of determining the duration between said obtaining and acquiring steps.

11. A method of distinguishing an actual position from an image position as claimed in claim 1 wherein said actual position appears to move in said generally eastward direction over time as a result of earth rotation, and said method additionally comprises the steps of:

predicting a third position that differs from said first position by a direction and distance which are responsive to earth rotation;

predicting a fourth position that differs from said second position by a direction and distance which are responsive to earth rotation; and determining whether said set of subsequent location parameters more closely corresponds to said third position or said fourth position.

12. A method of distinguishing an actual position from an image position as claimed in claim 1 additionally comprising the steps of:

placing a locator unit in an orbit around the earth so that said locator unit moves through space and so that said movement of said locator unit through space is substantially unaffected by earth rotation; and placing a locatable unit proximate the surface of the earth so that said locatable unit moves through space in response to earth rotation.

13. A method of distinguishing an actual position from an image position as claimed in claim 12 wherein said locator unit placing step comprises the step of causing said locator unit to move in a substantially north-south orbit around the earth.

14. A method of distinguishing an actual position from an image position as claimed in claim 12 wherein:

said locator unit moves relative to said locatable unit and said locator unit movement causes a nadir direction of said locator unit to intersect the earth along a ground track of said locator unit;

a first plurality of cells are projected from said locator unit toward the earth on a first side of said ground track, a second plurality of cells are projected from said locator unit toward the earth on a second side of said ground track, and a third plurality of cells are projected from said locator unit over said ground track;

said obtaining step comprises the step of engaging in communications between said locator unit and said locatable unit; and said method additionally comprises the step of determining whether said communications take place in one of said first plurality of cells, in one of said second plurality of cells, or in one of said third plurality of cells.

15. A method of distinguishing an actual position from an image position as claimed in claim 14 additionally comprising the step of performing said acquiring and selecting steps when said communications take place in one of said third plurality of cells.

16. A method of distinguishing an actual position from an image position as claimed in claim 1 wherein said set of original location parameters is obtained from communications conducted between a locator unit and a locatable unit which are spaced apart from one another, and said obtaining step comprises the steps of:

transmitting an electromagnetic signal from one of said locator unit and said locatable unit to the other of said locator and locatable units;

determining a duration required for said signal to propagate between said locator and locatable units; and including said propagation duration in said set of original location parameters.

17. A method of operating a radio telecommunications system having a satellite moving in an orbit around the earth and having a subscriber unit located proximate the earth's surface, said method comprising the steps of:

obtaining a set of original location parameters, said original set describing first and second positions of said subscriber unit relative to said satellite;

acquiring a set of subsequent location parameters; and selecting, as an actual position for said subscriber unit, the one of said first and second positions which, in response to said sets of original and subsequent location parameters, appears to move in a generally eastward direction over time; and qualifying communication services provided for said subscriber unit in response to said actual position for said subscriber unit.

18. A method of operating a radio telecommunications system as claimed in claim 17 wherein said obtaining step comprises the steps of:

transmitting an electromagnetic signal from one of said satellite and said subscriber unit to the other of said satellite and said subscriber unit; and determining a Doppler component of said signal; and determining a duration required for said signal to propagate between said satellite and said subscriber unit; and including said Doppler component and said propagation duration in said set of original location parameters.

19. A method of operating a radio telecommunications system as claimed in claim 18 wherein said acquiring step comprises the steps of:

transmitting a subsequent electromagnetic signal from one of said satellite and said subscriber unit to the other of said satellite and said subscriber unit;

determining a Doppler component of said subsequent signal;

determining a duration required for said subsequent signal to propagate between said satellite and said subscriber unit; and including said Doppler component of said subsequent signal and said propagation duration of said subsequent signal in said set of subsequent location parameters.

20. A method of operating a radio telecommunications system as claimed in claim 17 wherein:

said obtaining step comprises the step of measuring characteristics of a plurality of original electromagnetic signals communicated between said satellite and said subscriber unit, said plurality of original signals being communicated within a relatively short period of time;

said acquiring step comprises the step of measuring characteristics of a plurality of subsequent electromagnetic signals communicated between said satellite and said subscriber unit, said plurality of subsequent signals being communicated within a relatively short period of time; and said method additionally comprises the step of waiting a relatively long period of time, compared to said periods of time over which said original and subsequent signals are communicated, between said obtaining and acquiring steps.

21. A method of operating a radio telecommunications system as claimed in claim 17 wherein said actual position appears to move in said generally eastward direction over time as a result of earth rotation, and said method additionally comprises the steps of:

predicting a location of a third position that differs from one of said first and second positions by a direction and distance which are responsive to earth rotation; and determining whether said set of subsequent location parameters corresponds to said third position.

22. A method of operating a radio telecommunications system as claimed in claim 21 additionally comprising the step of determining, prior to said predicting step, the duration between said obtaining and acquiring steps.

23. A method of operating a radio telecommunications system as claimed in claim 21 wherein:

said predicting step predicts said third position with respect to said first position;

said predicting step additionally predicts a fourth position which differs from said second position by a direction and distance which are responsive to earth rotation; and said determining step determines whether said set of subsequent location parameters more closely corresponds to said third position or said fourth position.

24. A method of operating a radio telecommunications system as claimed in claim 17 additionally comprising the step of causing said satellite to move in a substantially north-south orbit around the earth.

25. A method of operating a radio telecommunications system as claimed in claim 17 wherein:

said satellite movement causes a nadir direction of said satellite to intersect the earth along a ground track of said satellite;

a first plurality of cells are projected from said satellite toward the earth on a first side of said ground track, a second plurality of cells are projected from said satellite toward the earth on a second side of said ground track, and a third plurality of cells are projected from said satellite over said ground track;

said obtaining step comprises the step of engaging in communications between said satellite and said subscriber unit;

said method additionally comprises the step of determining whether said communications take place in one of said first plurality of cells, in one of said second plurality of cells, or in one of said third plurality of cells; and performing said acquiring and selecting steps when said communications take place in one of said third plurality of cells.

26. A method of operating a radio telecommunications system as claimed in claim 25 additionally comprising the step of choosing, as an actual position for said subscriber unit, the one of said first and second positions that resides in the cell within which said communications take place, said choosing step being performed when said communications take place in one of said first or second plurality of cells.

27. A location determination system comprising:

at least one locator unit moving in an orbit around the earth;

at least one locatable unit residing proximate the earth's surface;

a measurement processor residing in one of said locator and locatable units, said measurement processor being configured to determine a Doppler component of an electromagnetic signal traveling between said locator and locatable units;

a location processor in data communication with said measurement processor, said location processor being configured to determine two positions for said locatable unit in response to said Doppler component and to determine which of said two positions moves relative to said locator unit in a generally eastward direction, said eastward moving position corresponding to a location of said locatable unit.

28. A location determination system as claimed in claim 27 wherein said locator unit moves in a substantially north-south orbit around the earth, and said movement is substantially unaffected by earth rotation.

29. A location determination system as claimed in claim 27 wherein said measurement processor is additionally configured to determine a duration for which an electromagnetic signal travels between said locator and locatable units; and said location processor is additionally configured so that said positions are determined in response to said Doppler component and said duration.

30. A location determination system as claimed in claim 27 wherein:

said locator unit movement causes a nadir direction of said locator unit to intersect the earth along a ground track of said locator unit;

said locator unit projects a first plurality of cells toward the earth on a first side of said ground track, projects a second plurality of cells toward the earth on a second side of said ground track, and projects a third plurality of cells toward the earth over said ground track; and said location processor comprises means for determining whether said electromagnetic signal was communicated in one of said first plurality of cells, in one of said second plurality of cells, or in one of said third plurality of cells.

31. A location determination system as claimed in claim 27 wherein said actual position appears to move in said generally eastward direction over time as a result of earth rotation, and said location processor comprises:

means for predicting a location of a third position that differs from one of said two positions by a direction and distance which are responsive to earth rotation; and means, coupled to said predicting means, for determining whether said one of said two positions moves to said third position.

* * * * *